United States Patent Office 3,329,667
Patented July 4, 1967

3,329,667
PROCESS FOR THE OXIDATION OF POLYETHYLENE
George L. Braude, North Linthicum, and Su Tiong Phoa, Baltimore, Md., assignors, by mesne assignments, to Allied Chemical Corporation, New York, N.Y., a corporation of New York
No Drawing. Filed Mar. 9, 1964, Ser. No. 350,600
5 Claims. (Cl. 260—94.9)

This invention relates to a process for producing oxidized high density linear polyolefins, especially polyethylene; more particularly this invention relates to a process for producing oxidized high density polyethylene having a uniform distribution of polar groups, by oxidizing narrow screen cuts of polyethylene.

It is known to us that oxidized linear polyethylene can be produced, having a density in the range of 0.937 to 1.050 g./cc., a crystalline melting point in the range 125–135° C. and a melt index in the range 0.1 to 7000, said oxidized polyethylene having been produced by heating polyethylene in solid form having a crystalline melting point in the range 127–137° C. and a density in the range 0.935–0.970 g./cc. in the presence of a free oxygen containing gas, e.g., air, at a temperature ranging from 105° C. up to but not including the crystalline melting point of said polyethylene until the carboxyl content of said polyethylene is in the range 0.2 to 2.0 milliequivalents per gram (meq./gm.) polymer, said oxidation step being performed at pressures from atmospheric up to 250 p.s.i.g.

This process supra is most economically feasible with particle form (PF) or similar powdered forms of the polymer. However, we have found that commercial PF grade high density polyethylene has a wide particle size distribution. We have further found that using the temperature and time conditions required to produce a certain carboxyl content range, smaller particles have a very high carboxyl content and larger particles a low carboxyl content for the same period of time. Therefore, although the average carboxyl content is in the range required, as determined by a random sampling of the resulting oxidized mixture, difficulties in subsequent applications of the oxidized product will quickly become apparent. That portion of the polymer that has a high carboxyl content is brittle and has a tendency to lose strength, thus weakening the material, an obviously undesirable characteristic in floor polishes or waxes. The material that has a low carboxyl content is difficult if not impossible to emulsify. Even if this is but a small percentage of the batch, it will be obvious to one skilled in the art that great amounts of time and effort will be expended either to attempt emulsification, or clean out solid polyethylene sludge from emulsification tanks.

It is therefore an object of this invention to provide a method for producing oxidized high density polyethylene having a narrow distribution of polar groups.

It is also an object of this invention to provide a method for producing oxidized high density polyethylene which can be easily and quickly used in subsequent formulations without waste or excessive loss of strength.

It is a further object of this invention to accomplish these objects without expensive and unneccessary equipment changes.

In summary, my invention comprises separating commercial high density polyethylene by screening into cuts of different particle size and then oxidizing each cut separately to the desired level of carboxyl content.

It is known in our laboratory that solid state oxidation of high density polyethylene results in oxidized high density polyethylene having a melt index in the range 0.1 to 7000 and containing 0.2–2.0 meq. of carboxyl group/gm. polyethylene.

Polyethylene can be readily oxidized in the solid state by various methods to give polymers containing carboxyl groups. The techniques for introducing carboxyl groups into polyethylene are exemplified by, but not limited to, the following methods: one method includes passing oxygen-containing gas over solid polyethylene in an oven at a temperature below the melting point of the polymer, e.g., 105–135° C. Still another method is to suspend particles of polyethylene in water or an organic solvent and either bubble air through the suspension or pressurize the system with air at temperatures ranging from 105° C. up to the melting point of the polymer. Yet another method is to pass oxygen-containing gas at a temperature from 105° C. up to the melting point of the polymer through a fluidized bed of polyethylene particles. In all the aforestated methods of oxidizing polyethylene, if desired, a minor amount, i.e., 0.05 to 5% by weight of the polyethylene of an organic peroxide, ozone, nitrogen tetroxide or other oxidation promoter can be blended with the polymer to eliminate the induction period and increase the oxidation rate. Superatmospheric pressure can be used if desired in any of the oxidation methods employed including those aforestated.

The high density polyethylene operable in this invention can be produced by many methods well known in the art. For example, polyethylene having a density of 0.935–0.970 can be obtained using the Phillips catalyst system, i.e., chromium oxide on a $SiO_2$–$Al_2O_3$ support wherein at least part of the chromium is in the hexavalent state. The polymerization is performed at temperatures of 60–260° C. See U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density polyethylene having a melt index less than 0.01. The term "melt index" as used herein is a known ASTM procedure, described in ASTM–1238–57T. Still another catalyst system yielding very high molecular weight polyethylene having a melt index less than 0.01 and a density of about 0.96 comprises $TiCl_3$ and diethyl aluminum chloride. A still further method or of producing high density polyethylene is in the Ziegler process wherein the catalyst consists essentially of compounds of metals of Groups IV–B, V–B, and VI–B and an aluminum trialkyl compound as set out in Belgian Patent 53,362 issued to K. Ziegler. Various other methods of forming high density polyethylene with a density in the range 0.935–0.970 are well known to those skilled in the art.

The high density polyethylenes opearble in the instant invention have a density in the range 0.935–0.970 g./cc. and a melting point in the range 115–137° C. prior to the oxidation step. However, the density of the polymer increases as the extent of oxidation increases. This is the result of the substitution of heavier oxygen atoms (atomic weight 16.0) in the polymer in place of hydrogen (atomic weight 1.008) or carbon (atom weight 12.01). Consequently the density ranges of the oxidized products of this invention range between 0.937 and 1.050 g./cc., the exact value in any instance depending on the initial density of the starting polymer, and the extent of oxidation. The general procedure for performing the present invention is to oxidize the high density polyethylene in particulate form in a suitable apparatus, e.g., a forced draft oven by passing an oxygen containing gas, e.g., air over the polymer while it is being heated at temperatures ranging from 105° C. up to, but not including, the melting point of the polymer.

If desired the oxidation induction period can be decreased by admixing the high density polyethylene with an oxidation promoter, e.g., an organic peroxide (usually 0.1 to 5.0% peroxide by weight of polymer) in a suitable mixing mechanism, e.g., a Twin Shell blender, at room temperature. Preferably the organic peroxide is solubilized in a hydrocarbon solvent, and the solvent is evaporated prior to the oxidation step. Solubilizing the peroxide in a solvent insures more uniform dispersion of the peroxide throughout the polymer. Various solvents for the peroxide are operable and the selection of a suitable one is governed by its solvent power on the peroxide employed and its inertness thereto. Operable solvents are well known to those skilled in the art and include volatile aromatic and aliphatic hydrocarbons such as benzene, toluene, pentane, and hexane.

The polymer is then subjected to oxidation as above. If ozone is used as a promoter, it is incorporated into the gas stream. Since the rate of oxidation increases with increasing temperature, it is preferred to carry out the oxidation at as high a temperature as possible without melting the polymeric material. Thus, temperatures within 10° C. below the melting point of the polymer are usually employed.

The oxidized high density polyethylene of the present invention has a melt index in the range 0.1 to 7000 and a carboxyl content of 0.20 to 2.0 meq./gm. polyethylene. It has been found that the melt index of the oxidized polymer can be maintained below 7000 even at the upper limit of the carboxyl content provided the starting polymer is of sufficiently high molecular weight. In general, the high density polyethylene of the instant invention has a weight average molecular weight in the range 20,000 to 2,000,000 or more calculated from fractionation data in accord with the procedure in "Techniques of Polymer Characterization," P. W. Allen, Academic Press Inc., New York, N.Y. (1959), p. 3. In regard to the lower limit of the range, care must be exercised that the oxidation does not degrade the polymer to the extent that improved properties which are partially afforded by high molecular weight, e.g., high tensile strength and abrasion resistance are not obtained.

The oxidation step can be terminated at any operable degree of oxidation and if desired subsequently stabilized, by addition of a suitable antioxidant, e.g., N-phenyl-2-naphthyl amine, which can be added to the oxidized polymer.

The oxidized high density polyethylene of the instant invention, wherein the carboxyl content is 0.2 to 2.0 milliequivalents/gm. polyethylene is readily emulsified in a continuous aqueous phase in the presence of suitable well known emulsifiers and from 40% to 200% of the theoretical amount of a base required to neutralize the carboxylic acid groups present in the polymer. Both ionic and non-ionic emulsifying agents are operable to emulsify the oxidized high density polymer.

For optimum results, the polyethylene, crumb or powder, is separated into four screen cuts: on 10 mesh, 10–14 mesh, 14–20 mesh, and through 20 mesh. The respective weight percents of polyethylene in each cut has been observed in our laboratories to be 10%, 30%, 40% and 20%. Our invention is also operable with three cuts: on 10 mesh, 10–20 mesh and through 20 mesh. However, it has been our experience that any less cuts are useless in controlling oxidation problems. U.S. standard mesh screen was used for all the experiments.

The invention is further described by, but not limited to, the following examples.

*Example I.—Control*

The equipment used in bench scale oxidations was a rotating glass reactor of 10 liters capacity having diametrically opposed openings, which provided inlet for the free oxygen containing gas, and outlet for off gases. The said reactor was immersed in a thermostatically controlled oil bath, and continuously rotated while the oxidation was in progress.

1000 g. of commercial high density PF polyethylene having a crystalline M.P. of 135° C., density of 0.955 and a High Load Melt Index (HLMI) of 0.9 was charged to said reactor at room temperature. Rotation was started, and a nitrogen purge applied to displace the air. HLMI is a modification of a known ASTM process, in which ten times as much weight is used to get a reading. The test is described in ASTM–1238–577T, condition F.

The polyethylene was then heated to 125° C., and air passed over the polymer for 39 hours at which point the oxidation was stopped. After cooling, a sample of the material was analyzed for free carboxyl groups (COOH) content by dissolving a known weight of polymer in hot xylene and titrating to a phenolphthalein end point with a standardized KOH in 75:25 xylene: absolute ethanol solution. The polymer contained 0.48 milli-equivalent COOH average per gram polymer.

The oxidized polyethylene was then separated by screening, yielding the following arts.

Screen cuts: COOH (meq./gm.)
(a) on 10 mesh _____ 0.35
(b) 10–14 mesh _____ 0.38
(c) 14–20 mesh _____ 0.45
(d) through 20 mesh _____ 0.57

Each cut was weighed, it was found that cut *a* contained about 10% by weight of the polymer; cut *b* was about 30%; cut *c* was about 40%; and cut *d* was about 20%.

*Example II*

The apparatus used in Example I was also used here. The polymer and procedure of Example I were also duplicated, except that the polymers were screened into the four cuts before being charged to the reactor. Each cut was then oxidized at 125° C. However, 1000 g. of polymer was used for each run (i.e., 1000 g. of 10 cut, 1000 g. 10–14 cut, etc., so that oxidation times would be comparable in each case. Periodically, while each cut was being oxidized, a sample was removed so that COOH content could be determined. In each case when the COOH content was about 0.48 meq./gm., the oxidation was stopped.

| Screen Cut | Oxidation Time | COOH |
|---|---|---|
| (e) On 10 | 47 hours | 0.47 |
| (f) 10–14 | 40 hours | 0.48 |
| (g) 14–20 | 37 hours | 0.48 |
| (h) Through 20 | 35 hours | 0.49 |

Having described this invention, what is claimed is:
1. The process which comprises separating into at least three distinct screen cuts, and heating each cut to a temperature below its melting point but within about 10° of its melting point in the presence of a free oxygen containing gas, particles of linear high density polyethylene having a crystalline melting point in the range 127°–137° C., and a density in the range 0.935–0.970 g./cc., so as to produce the desired carboxyl level.

2. The process according to claim 1, which comprises screening the polyethylene into screen cuts comprising substantially on 10, 10–14, 14–20, and through 20 mesh sizes; then heating each screen cut separately to a temperature within about 5° of its melting point in the presence of a free oxygen containing gas to oxidize each cut to the same level of carboxyl group content.

3. The process of claim 2, whereby the starting PF polyethylene has a HLMI of 0.9, a density of 0.955; and a M.P. of 135° C.

4. The process of claim 3, in which the reaction temperature is 125° C.

5. The process of claim 4, in which each screen cut is oxidized to a carboxyl content level of about 0.48 meq./gm.

References Cited
UNITED STATES PATENTS 3,177,193 4/1965 Scott _____ 260—94.9
3,232,917 2/1966 McCall et al. _____ 260—94.9

JOSEPH L. SCHOFER, *Primary Examiner.*

L. EDELMAN, *Assistant Examiner.*